United States Patent Office 3,594,367
Patented July 20, 1971

3,594,367
PROCESS FOR PRODUCTION OF PENICILLIN
Jinnosuke Abe, Tagata-gun, Shizuoka-ken, Tetsuo Watanabe, Tokyo, Teruo Take, Tagata-gun, Shizuoka-ken, Kentaro Fujimoto, Sunto-gun, Shizuoka-ken, Tadashiro Fujii and Masashi Kuramoto, Tagata-gun, Shizuoka-ken, and Sadami Kobari, Mishima-shi, Japan, assignors to Toyo Jozo Kabushiki Kaisha, Shizuoka-ken, Japan
No Drawing. Filed Nov. 29, 1968, Ser. No. 780,234
Claims priority, application Japan, Nov. 29, 1967, 42/76,142; Mar. 9, 1968, 43/15,278
Int. Cl. C07d *99/16*
U.S. Cl. 260—239.1          6 Claims

ABSTRACT OF THE DISCLOSURE

α-Phenoxyalkyl penicillin and salts thereof are produced by reacting 6-aminopenicillanic acid or salts thereof with a novel N,N-diacyl compound of the formula

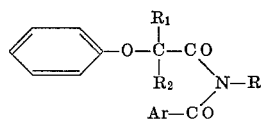

in which R is alkyl, cycloalkyl, aryl, substituted aryl, aralkyl, substituted aralkyl or phenylalkenyl, Ar is phenyl, phenoxyalkyl, or substituted phenyl, and $R_1$ and $R_2$ are hydrogen or lower alkyl.

---

This invention relates to a process for the production of α-phenoxyalkyl penicillin. More particularly, it relates to the novel process for the production of α-phenoxyalkyl penicillin having the formula:

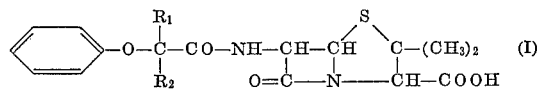

or a salt thereof, wherein $R_1$ and $R_2$ are the same or different and each represents hydrogen or a lower alkyl group, which comprises: reacting an N,N-diacyl compound of the following formula:

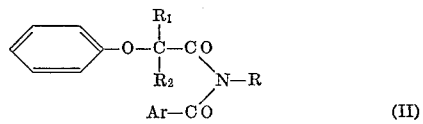

wherein R represents an alkyl, cycloalkyl, aryl, substituted aryl, aralkyl, substituted aralkyl or phenylalkenyl group and Ar represents a phenyl, phenoxyalkyl, or substittued phenyl group and $R_1$ and $R_2$ have the same meaning as set forth hereinabove, with 6-aminopenicillanic acid of the formula:

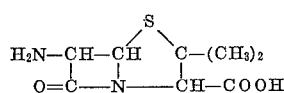

or a salt thereof.

According to prior syntheses in the field of this invention, the penicillin derivatives were prepared by the acylation of an amino group in 6-aminopenicillanic acid. As examples of the said acylating process, there may be mentioned, for example, a process by way of condensation of a carboxylic acid by dicyclohexylcarbodiimide, carbodiimidazole or the like, or a synthetic method by employing an acylating agent such as carboxylic acid halides, acid anhydrides, mixed anhydrides with other carboxylic acids, carboxylic acid azides, carboxylic acid-p-nitrophenyl esters or the like. These prior processes, however, have a number of disadvantages and therefore are not always ideal synthetic methods for the production of said semi-synthetic penicillin. For example, according to the prior process for the preparation of α-phenoxyethyl penicillin, 6-aminopenicillanic acid is reacted with α-phenoxypropionic acid chloride in water or aqueous solvents. In this process, for instance, miscontrol of pH of the reaction medium results in a decrease in yield and further a loss of activity caused by chemical decomposition of α-phenoxyethyl penicillin. Also, in the process described hereinabove, α-phenoxypropionyl chloride is produced simultaneously with α-phenoxyethyl penicillin and is difficult to remove completely from the reaction mixture, giving a less pure product.

This invention provides a new process for the production of α-phenoxyalkyl penicillin employing a new N,N-diacyl compound having the Formula II as an acylating agent of 6-aminopenicillanic acid, with the great advantages described hereinafter.

The N,N-diacyl compound may generally be prepared by previously established methods, for instance by reacting a keteneimine and carboxylic acid [refer to J. Am. Chem. Soc., 80, 4065–4069 (1958)], reacting an N-substituted phenylimidechloride and substituted sodium benzoate [refer to J. Chem. Soc., 2957–2966 (1960)], with substituted aniline and acid chloride in cumene in the presence of hydrogen chloride gas (refer to U.S. Pat. 3,158,650), with substituted aniline and acetylchloride (acid anhydride, acid halide) [refer to Belgian Pat. 622,131; Chem. Abst., 59, 11300h (1963)], reacting with N-substituted amide and acid anhydride or acid chloride (refer to Japanese patent pub., 12921/64) or the like. A starting material, N,N-diacyl compound of the Formula II [hereinafter designated as N,N-diacyl compound (II)] used in this invention is a novel compound and, preferably, is prepared according to the method discovered by the present inventors, which comprises: reacting a carboxylic acid of the formula

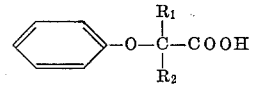

wherein $R_1$ and $R_2$ have the same meaning as set forth hereinbefore, with an imide chloride compound of the formula

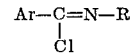

wherein R and Ar have the same meaning as set forth hereinbefore, in the presence of a tertiary organic amine.

The following preparative methods illustrate several modes of preparing N,N-diacyl compound (II) in the present invention.

PREPARATION 1

N-α-phenoxypropionyl-N-benzoyl-β-phenylethylamine

Triethylamine (14.0 ml., 0.1 mole) was added dropwise to a mixture of α-phenoxypropionic acid (16.6 g., 0.1 mole) and dehydrated tetrahydrofuran (150 ml.) with stirring, to give a solution of α-phenoxypropionate triethylamine salt. To this solution, oily N-β-phenylethylbenzimidechloride (0.09 mole) in dehydrated tetrahydrofuran (50 ml.) was added dropwise with stirring and cooling. The solution was stirred for three hours while it attained room temperature, and the precipitated triethylamine hydrochloride was removed by filtration. The filtrate was concentrated in vacuo, was then dissolved in diethylether (200 ml.), and was washed twice with 0.2 N hydrochloric acid (100 ml.) to remove unreacted triethylamine and α-phenoxypropionic acid. After the diethylether solution was dehydrated with anhydrous sodium sulfate and filtered, diethylether was evaporated under vacuum to crystallize N-α-phenoxypropionyl - N-benzoyl-β-phenylethylamine after adding petroleum ether.

Yield: 29.2 g. (recovery: 78.2%)
M.P.: 68.5–70.5° C.

Elemental anal.—Calculated as based upon $C_{24}H_{25}NO_5$ (percent): C, 77.19; H, 6.21; N, 3.75. Found (percent): C, 77.45; H, 6.20; N, 3.63.

Thin layer chromatography on silica gel revealed the product as having an $R_f$ value of 0.8 as developed with benzene and ethylacetate in the ratio of 20:1 (v./v.).

PREPARATION 2

N-α-phenoxypropionyl-N-p-methoxybenzoyl-benzylamine

In Preparation 1, N-β-phenylethyl-benzimidechloride was replaced by N-benzyl-p-methoxybenzimidechloride to produce N - α - phenoxypropionyl - N - p - methoxybenzoyl-benzylamine as an oily material.

Yield: 36.2 g. (recovery: 93.0%)
$R_f$ value on silica gel thin layer chromatogram: 0.57 (developer; benzene:ethylacetate=25:1).

PREPARATION 3

N-α-phenoxypropionyl-N-m-toluoyl-cyclohexylamine

In Preparation 1, N-β-phenoxyethyl benzimidechloride was replaced by N-cyclohexyl-m-toluoylimidechloride to produce N - α - phenoxypropionyl - N - m - toluoyl - cyclohexylamine as an oily material.

Yield: 27.9 g. (recovery: 76.4%)
$R_f$ value on silica gel thin layer chromatogram: 0.64 (developer; the same as in Preparation 2).

PREPARATION 4

N-α-phenoxypropionyl-N-benzoyl-p-toluidine

Dehydrated pyridine (8.08 ml., 0.1 mole) was added dropwise to a mixture of α-phenoxypropionic acid (16.6 g., 0.1 mole) and dehydrated chloroform (150 ml.) with stirring.

To this solution, oily N-p-tolyl-benzimidechloride (0.09 mole) in dried chloroform (50 ml.) was added dropwise with cooling and stirring. The chloroform solution was stirred overnight at room temperature, and the reaction mixture was washed twice with 0.2 N hydrochloric acid (100 ml.), 0.5 N sodium bicarbonate (100 ml.) and distilled water (100 ml.) respectively, to remove unreacted pyridine and α-phenoxypropionic acid. After the said chloroform solution was dehydrated with anhydrous sodium sulfate and filtered, the chloroform was evaporated in vacuo to yield N-α-phenoxypropionyl - N - benzoyl-p-toluidine as an oily material.

Yield: 35.1 g. (recovery: 97.7%)
$R_f$ value on silica gel thin layer chromatogram: 0.58 (developer; the same as in Preparation 2).

PREPARATION 5

N-α-phenoxy-n-butyryl-M-benzoyl-p-toluidine

In Preparation 4, α-phenoxypropionic acid was replaced by α-phenoxy-n-butyric acid to produce N-α-phenoxy-n-butyryl-N-benzoyl-p-toluidine as an oily material.

Yield: 30.7 g. (recovery: 83.0%)

PREPARATION 6

N-α-phenoxypropionyl-N-benzoyl-p-toluidine

Triethylamine was added dropwise to a mixture of benzoic acid (12.2 g., 0.1 mole) and dehydrated tetrahydrofuran with stirring. To this solution, oily N-p-tolyl-α - phenoxypropionimidechloride (0.09 mole) in dehydrated tetrahydrofuran (50 ml.) was added dropwise with cooling and stirring. After stirring for three hours, precipated triethylamine hydrochloride was filtered off, and the residual solution was purified as in Preparation 1 yielding N - α - phenoxypropionyl - N - benzoyl - p -toluidine as an oily material.

PREPARATION 7

N,N-di-α-phenoxypropionyl-cyclohexylamine

Triethylamine (14.0 ml., 0.1 mole) was added dropwise to a mixture of α-phenoxypropionic acid (16.6 g., 0.1 mole) and dehydrated tetrahydrofuran (170 ml.) with stirring, to give a solution of triethylamine α-phenoxypropionate. To this solution, oily N-cyclohexyl-α-phenoxypropionimidechloride (0.09 mole) in dry tetrahydrofuran (50 ml.) was added dropwise with stirring and cooling. The solution was stirred for two hours while it attained room temperature, and the precipitated triethylamine hydrochloride was removed by filtration. The filtrate was concentrated in vacuo, was then dissolved in diethyl ether (200 ml.), and was washed twice with each of 0.2 N hydrochloric acid (150 ml.), 0.5 N sodium bicarbonate (150 ml.) and water (150 ml.), to remove unreacted triethylamine and α-phenoxypropionic acid. After the said diethyl ether solution was dehydrated with anhydrous sodium sulfate and filtered, diethyl ether was evaporated in vacuo to give the concentrate.

N,N-di-α-phenoxypropionyl-cyclohexylamine was crystallized from the concentrate by adding petroleum ether thereto.

Yield: 29.5 g. (recovery: 74.7%)
M.P.: 114.5–115.5° C.

Elemental anal.—Calculated as based upon $C_{24}H_{29}NO_4$ (percent): C, 72.89; H, 7.39; N, 3.54. Found (percent): C, 73.06; H, 7.41; N, 3.39.

$R_f$ value on silica gel thin layer chromatogram: 0.85 (developer; benzene:ethylacetate=25:1).

PREPARATION 8

N,N-di-α-phenoxypropionyl-p-methoxybenzylamine

In Preparation 7, N-cyclohexyl-α-phenoxypropionimidechloride was replaced by N-p-methoxybenzyl-α-phenoxypropionimidechloride, and two hours' reaction was replaced by three hours' reaction to produce N,N-di-α-phenoxypropionoyl-p-methoxybenzylamine.

Yield: 37.9 g. (recovery: 87.5%)
M.P.: 90–100° C.

Elemental analysis.—Calculated as based upon $C_{26}H_{27}NO_5$ (percent): C, 72.04; H, 6.28; N, 3.23. Found (percent): C, 72.24; H, 6.36; N, 3.25.

$R_f$ value on thin layer chromatogram (silica gel): 0.61.

PREPARATION 9

N,N-di-α-phenoxypropionyl-n-butylamine

In Preparation 7, N-cyclohexyl - α - phenoxypropionimidechloride and two hours' reaction were replaced by N-n-butyl - α - phenoxypropionimidechloride and three hours' reaction to produce N,N-di-α-phenoxypropionyl-n-butylamine as an oily material.

Yield: 28.9 g. (recovery: 78.3%)
$R_f$ value on silica gel thin layer chromatogram: 0.76 (developer; the same as in Preparation 1).

PREPARATION 10

N,N-di-α-phenoxy-n-butyryl-n-hexylamine

Triethylamine (14.0 ml., 0.1 mole) was added dropwise to a mixture of α-phenoxy-n-butyric acid (18.0 g., 0.1 mole) and dehydrated tetrahydrofuran (180 ml.) with stirring, to give a solution of triethylamine α-phenoxybutyric acid. To this solution was added dropwise oily N-n-hexyl-phenoxybutylimidechloride (0.09 mole) in dry tetrahydrofuran (50 ml.) with stirring and cooling. The solution was stirred for four hours at room temperature, and the precipitated triethylamine hydrochloride was removed by filtration. The filtrate was concentrated in vacuo, was then dissolved in diethyl ether (200 ml.), and was washed successively with dilute hydrochloric acid, aqueous sodium bicarbonate solution and water. After the said diethyl ether solution was dehydrated with anhydrous sodium sulfate and filtered, diethyl ether was evaporated in vacuo to give the concentrate. This concentrate was then extracted with dehydrated petroleum ether and further concentrated thereafter to yield N,N-di-α-phenoxy-n-butyryl-n-hexylamine as an oily material.

Yield: 29.7 g. (recovery: 69.8%)

PREPARATION 11

N,N-di-α-phenoxyisobutyryl-p-toluidine

Triethylamine (14.0 ml., 0.1 mole) was added dropwise to a mixture of α-phenoxy-α-methyl-propionic acid (18.0 g., 0.1 mole) and dehydrated tetrahydrofuran (180 ml.) with stirring, to give a solution of triethylamine α-phenoxy-α-methyl-propionate. To this solution was added dropwise oily N-p-tolyl-α-phenoxy-α-methyl-propionimidechloride (0.09 mole) in dry tetrahydrofuran (50 ml.) with stirring and cooling. The solution was stirred for 16 hours at room temperature, and the precipitated triethylamine hydrochloride was removed by filtration and then concentrated in vacuo. N,N-di-α-phenoxyisobutyryl-p-toluidine as an oily material was purified by the procedure as described in Preparation 10.

Yield: 30.9 g. (recovery: 71.5%)

PREPARATION 12

N,N-di-α-phenoxyacetyl-p-ethoxyaniline

Triethylamine 14.0 ml., 0.1 mole) was added dropwise to a mixture of α-phenoxyacetic acid (15.2 g., 0.1 mole) and dehydrated tetrahydrofuran (150 ml.) with stirring, to give a solution of triethylamine α-phenoxyacetic acid. To this solution was added dropwise oily N-p-ethoxyphenyl - α - phenoxyacetimidechloride (0.09 mole) in dry tetrahydrofuran (50 ml.) with stirring and cooling. The solution was stirred for 16 hours at room temperature. The precipitated triethylamine hydrochloride was removed by filtration and concentrated in vacuo. N,N-di-α-phenoxyacetyl-p-ethoxyaniline as an oily material was purified by the same procedure as described in Preparation 10.

Yield: 36.5 g. (recovery: 90.0%)

Examples of compounds which correspond to N,N-diacyl compound (II) and therefore are useful as the starting materials in the process of the present invention are included as follows:

N,N-di-α-phenoxypropionyl-methylamine,
N,N-di-α-phenoxypropionyl-ethylamine,
N,N-di-α-phenoxypropionyl-n-propylamine,
N,N-di-α-phenoxypropionyl-isopropylamine
N,N-di-α-phenoxypropionyl-n-butylamine,
N,N-di-α-phenoxypropionyl-isobutylamine,
N,N-di-α-phenoxypropionyl-t-butylamine,
N,N-di-α-phenoxypropionyl-n-pentylamine,
N,N-di-α-phenoxypropionyl-n-hexylamine,
N,N-di-α-phenoxypropionyl-n-heptylamine,
N,N-di-α-phenoxypropionyl-n-octylamine,
N,N-di-α-phenoxypropionyl-n-nonylamine,
N,N-di-α-phenoxypropionyl-n-decylamine,
N,N-di-α-phenoxypropionyl-n-undecylamine,
N,N-di-α-phenoxypropionyl-n-dodecylamine,
N,N-di-α-phenoxypropionyl-n-tetradecylamine,
N,N-di-α-phenoxypropionyl-aniline,
N,N-di-α-phenoxypropionyl-m-chloroaniline,
N,N-di-α-phenoxypropionyl-m-bromoaniline,
N,N-di-α-phenoxypropionyl-3,4-dichloroaniline,
N,N-di-α-phenoxypropionyl-p-toluidine,
N,N-di-α-phenoxypropionyl-m-toluidine,
N,N-di-α-phenoxypropionyl-p-ethylaniline,
N,N-di-α-phenoxypropionyl-p-anisidine,
N,N-di-α-phenoxypropionyl-m-anisidine,
N,N-di-α-phenoxypropionyl-p-ethoxyaniline,
N,N-di-α-phenoxypropionyl-m-ethoxyaniline,
N,N-di-α-phenoxypropionyl-benzylamine,
N,N-di-α-phenoxypropionyl-β-phenylethylamine,
N,N-di-α-phenoxypropionyl-p-methoxybenzylamine,
N,N-di-α-phenoxypropionyl-p-methylbenzylamine,
N,N-di-α-phenoxypropionyl-m-methylbenzylamine,
N,N-di-α-phenoxypropionyl-p-chlorobenzylamine,
N,N-di-α-phenoxypropionyl-3,4-dichlorobenzylamine,
N,N-di-α-phenoxypropionyl-1-naphthylamine,
N,N-di-α-phenoxypropionyl-2-naphthylamine,
N,N-di-α-phenoxy-n-butyryl-n-butylamine,
N,N-di-α-phenoxy-n-butyryl-n-hexylamine,
N,N-di-α-phenoxy-n-butyryl-aniline,
N,N-di-α-phenoxy-n-butyryl-p-toluidine,
N,N-di-α-phenoxy-n-butyryl-p-anisidine,
N,N-di-α-phenoxy-n-butyryl-p-ethoxyaniline,
N,N-di-α-phenoxy-n-butyryl-β-phenylethylamine,
N,N-di-α-phenoxy-n-butyryl-p-methylbenzylamine,
N,N-di-α-phenoxy-n-butyryl-1-naphthylamine,
N,N-di-α-phenoxyisobutyryl-n-butylamine,
N,N-di-α-phenoxyisobutyryl-n-hexylamine,
N,N-di-α-phenoxyisobutyryl-aniline,
N,N-di-α-phenoxyisobutyryl-p-toluidine,
N,N-di-α-phenoxyisobutyryl-p-anisidine,
N,N-di-α-phenoxyisobutyryl-p-ethoxyaniline,
N,N-di-α-phenoxyisobutyryl-β-phenylethylamine,
N,N-di-α-phenoxyisobutyryl-p-methylbenzylamine,
N,N-di-α-phenoxyisobutyryl-1-naphthylamine,
N,N-di-α-phenoxyisobutyryl-m-chloroaniline,
N,N-di-α-phenoxyacetyl-aniline,
N,N-di-α-phenoxyacetyl-p-toluidine,
N,N-di-α-phenoxyacetyl-p-ethoxyaniline,
N,N-di-α-phenoxyacetyl-p-anisidine, and the like.

Further examples of compounds which correspond to Formula II and therefore are useful as the starting materials in this invention are listed in the following Table 1.

TABLE 1

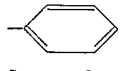

(II)

| $R_1$ | $R_2$ | R | Ar |
|---|---|---|---|
| H | $CH_3$ | $-(CH_2)_2 \cdot CH_3$ | 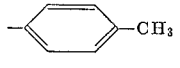 |
| H | $CH_3$ | $-(CH_2)_3 \cdot CH_3$ | Same as above. |
| H | $CH_3$ | $-(CH_2)_5 \cdot CH_3$ | Do. |
| H | $CH_3$ | Same as above | 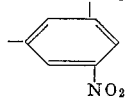 |
| | CH | ...do... | 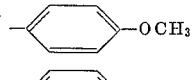 |
| H | $CH_3$ | ...do... | 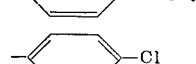 |
| H | $CH_3$ | ...do... | 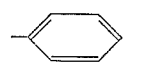 |
| H | $CH_3$ | 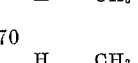 | 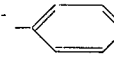 |
| H | $CH_3$ | 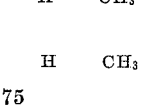 | 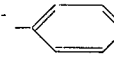 |
| H | $CH_3$ | Same as above |  |

| R₁ | R₂ | R | Ar |
|---|---|---|---|
| H | $CH_3$ | ...do... | —⟨phenyl⟩—$CH_3$ |
| H | $CH_3$ | ...do... | —⟨phenyl⟩—Cl |
| H | $CH_3$ | —$CH_2·CH_2$—⟨phenyl⟩ | —⟨phenyl⟩ |
| H | $CH_3$ | Same as above | —⟨phenyl⟩—$CH_3$ |
| H | $CH_3$ | ...do... | —⟨phenyl⟩—$OCH_3$ |
| H | $CH_3$ | ...do... | —⟨phenyl⟩—Cl |
| H | $CH_3$ | ...do... | —⟨phenyl⟩—$NO_2$ |
| H | $CH_3$ | —⟨phenyl⟩ (with $CH_3$) | —⟨phenyl⟩—$CH_3$ |
| H | $CH_3$ | Same as above | —⟨phenyl⟩ |
| H | $CH_3$ | —⟨phenyl⟩—$CH_3$ | Same as above |
| H | $CH_3$ | —⟨phenyl⟩—$OCH_3$ | Do. |
| H | $CH_3$ | —⟨phenyl⟩—Cl | Do. |
| H | $CH_3$ | —⟨phenyl⟩—Cl (2,4-di) | Do. |
| H | $CH_3$ | —⟨naphthyl⟩ | Do. |
| H | $CH_3$ | —⟨phenyl⟩ (with H) | —⟨phenyl⟩—$CH_3$ |
| H | $C_2H_5$ | —$(CH_2)_5·CH_3$ | —⟨phenyl⟩ |
| H | $C_2H_5$ | —$CH_2·CH_2$—⟨phenyl⟩ | Same as above |
| H | $C_2H_5$ | Same as above | —⟨phenyl⟩—Cl |
| H | $C_2H_5$ | ...do... | —⟨phenyl⟩—$CH_3$ |
| H | $C_2H_5$ | ...do... | —⟨phenyl⟩—$OCH_3$ |
| H | $C_2H_5$ | —⟨phenyl⟩—$CH_3$ | —⟨phenyl⟩ |
| H | $C_2H_5$ | —⟨naphthyl⟩ | Same as above |
| H | $C_2H_5$ | —⟨phenyl⟩—Cl (2,4-di) | Do. |
| $CH_3$ | $CH_3$ | —$CH_2·CH_2$—⟨phenyl⟩ | —⟨phenyl⟩—Cl |
| $CH_3$ | $CH_3$ | Same as above | —⟨phenyl⟩—$CH_3$ |
| $CH_3$ | $CH_3$ | —⟨phenyl⟩—Cl (2,4-di) | —⟨phenyl⟩ |
| $CH_3$ | $CH_3$ | —⟨phenyl⟩—$CH_3$ | Same as above |

N,N-diacyl compound (II) used in this invention is a novel compound, being an odorless neutral substance in nature and also quite stable in water. It is substantially insoluble in acid or alkaline solution, and is soluble in most organic solvents. N,N-diacyl compound (II) can occasionally be isolated in crystalline form, however, it is obtained more practically as an oily material, and thus, is directly used for the next reaction with 6-aminopenicillanic acid without separation and purification. It is altogether unpredictable that the said N,N-diacyl compound (II) should have an acylating activity for 6-aminopenicillanic acid, as it is a comparatively stable substance by nature.

α-Phenoxyalkyl penicillin, represented by Formula I [hereinafter designated as α-phenoxyalkyl penicillin (I)] is produced by reaction of the said N,N-diacyl compound (II) and 6-aminopenicillanic acid.

The aforementioned acylation reaction is illustrated as follows:

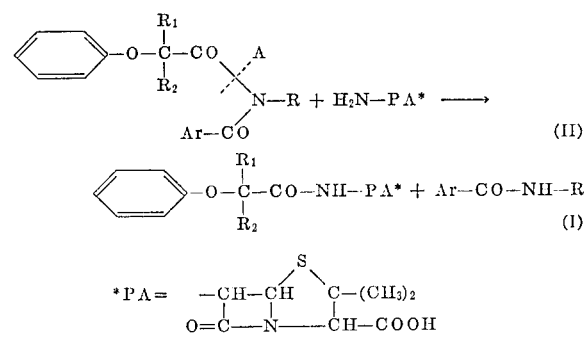

wherein $R_1$, $R_2$, Ar and R have the same meaning as set forth hereinbefore.

In the above illustrated reaction, the conjugated group Ar, which participates in stabilizing the chemical bond "—OC—N—CO—" therein, is replaced by a phenyl or substituted phenyl group, therefore the electron pair is pulled thereto, and compound (II) is cleaved selectively at "_ _ _ _ A" as shown in Formula II, and so the desired α-phenoxyalkyl penicillin (I) is formed.

The aforesaid acylating reaction may preferably be conducted in suitable organic solvents. The organic solvent which may preferably be employed should be a solvent for solubilizing N,N-diacyl compound (II) and 6-aminopenicillanic acid. Among suitable solvents for employment as the reaction medium are dimethylformamide, tetrahydrofuran, dioxane, methylisobutylketone and the like.

6-aminopenicillanic acid may be used in the form of a free acid in the reaction, however, it is highly satisfactory to use in the form of a salt, e.g., a metal salt such as the potassium or sodium salt, or a tertiary amine salt such as the triethylamine, pyridine, dimethylaniline salt or the like.

Among the most satisfactory and preferably used forms are the tertiary amine salts of 6-aminopenicillanic acid. The tertiary amine salt of 6-aminopenicillanic acid cannot always be isolated, and may be used as a solution or suspension of 6-aminopenicillanic acid in a tertiary amine solvent.

The tertiary amine may preferably be used in 1 to 2 molar excess of the 6-aminopenicillanic acid.

Adding a small amount of water to the reaction mixture is naturally applicable, if the reaction is carried out with a metal salt of 6-aminopenicillanic acid, because the solubility of 6-aminopenicillanic acid metal salt is increased in the presence of water, and therefore, in this case, the aforesaid acylating reaction proceeds more rapidly with water than without water.

In this acylating procedure, an amount of N,N-diacyl compound (II) may preferably be supplied in 1.5 to 2.0 molar excess per mole of 6-aminopenicillanic acid or salt thereof. If the reaction proceeds with equimolecular amounts of the correponding reagents, there is a tendency to decrease the yield of α-phenoxyalkyl penicillin.

According to the aforementioned acylating reaction, α-phenoxyalkyl penicillin (I) is produced, and also N-substituted amide as a by-product, represented by the formula Ar—CONH—R, wherein A and Ar have the same meaning as set forth hereinbefore, and unreacted N,N-diacyl compound is contained in the reaction mixture.

α-Phenoxyalkyl penicillin (I) prepared by the process of the invention in such a manner as described hereinbefore exists, depending on the reaction conditions, in free acid form or salt form, such as a metal salt, for example, the potassium or sodium salt or the like, and tertiary amine salt in the reacted mixture. The said product, α-phenoxyalkyl penicillin is isolated by the techniques used with benzylpenicillin and phenoxymethylpenicillin in the prior preparative methods. Thus, for instance, the product can be extracted with a water-immiscible organic solvent such as methyl isobutyl ketone, diethyl ether, ethyl acetate, butyl acetate or the like, at acid pH (below pH 2) and then recovered by extraction with an aqueous alkaline solution after washing the said extract with water until the pH of the wash water is neutral, or recoved as a potassium or sodium salt by conversion to a solvent-insoluble salt, as by neutralization with an n-butanol or butyl acetate solution of sodium or potassium 2-ethylhexanoate; or the product can be precipitated from the said aqueous alkaline solution, containing α-phenoxyalkyl penicillin (I), as a water-insoluble salt of an amine such as N,N'-dibenzylethylenediamine or the like.

In the process of this invention, N-substituted benzamide or N-substituted α-phenoxyalkylamide produced as the byproduct in the acylating reaction and unreacted N,N-diacyl compound (II) are insoluble in aqueous acid or alkaline solution, and hence remain in the organic solvent phase, whenever α-phenoxyalkyl penicillin (I) is isolated by extracting the said water-immiscible organic solvent phase with an aqueous alkaline solution in the aforementioned separation procedure of the product. To the remaining organic solvent phase or concentrates thereof are added an amine represented by the formula R—NH$_2$, wherein R has the same meaning as set forth hereinbefore, and so the amine is reacted with the remaining excess N,N-diacyl compound (II) to provide N-substituted benzamide or N-substituted α-phenoxyalkylamide. The thus obtained amide can be reused as a starting material of the compound having an imidechloride group, a precursor of N,N-diacyl compound (II).

The process of this invention has a number of advantages, some of which are as follows: The N,N-diacyl compound (II) is a relatively stable and odorless neutral substance, and hence is not only easy to work with but also does not necessitate careful control of pH in the reaction with 6-aminopenicillanic acid. The acylating process of this invention can proceed substantially at room temperature. Since N,N-diacyl compound (II) is not extractable on account of its insolubility in aqueous acid or alkaline solution, it is possible to isolate with high purity the produced α-phenoxyalkyl penicillin alone from the completed reaction mixture. Also it is easy to separate N-substituted benzamide or N-substituted α-phenoxyalkylamide produced as a by-product and α-phenoxyalkyl penicillin, respectively. And further, the said amide can be reused as a starting material of N,N-diacyl compound.

The process of this invention as described hereinbefore is thus a new process for the production of α-phenoxyalkyl penicillin.

The following examples are set forth for purposes of illustration only and are not to be construed as limiting the scope of the invention.

EXAMPLE 1

α-Phenoxyethylpenicillin 6-aminopenicillanic acid (1.08 g., 5 mmole), triethylamine (1.4 ml., 10 mmole) and oily N-α-phenoxypropionyl-N-benzoyl-p-toluidine (3.59 g., 10 mmoles) were added dropwise to dimethylformamide (4 ml.) with stirring at room temperature. This reaction mixture changed gradually from a suspension to a solution after three or four hours. The reaction was almost complete after 20 hours as determined by the hydroxylamine assay on a thin layer chromatogram of silica gel. To the reaction mixture methyl isobutyl ketone (25 ml.) and water (10 ml.) were added and the pH of the aqueous layer was adjusted to about pH 2 by dropwise addition of 1 N hydrochloric acid, with shaking. In the aqueous phase there was contained unreacted 6-aminopenicillanic acid and excess triethylamine hydrochloride. The upper layer, the organic solvent phase, was washed with water and 0.5 N sodium bicarbonate solution was added with stirring until it attained neutrality. By this procedure α-phenoxyethylpenicillin alone was transferred into the lower aqueous phase. To this aqueous phase, a solution of N,N'-dibenzylethylene diamine diacetate in water was added to isolate α-phenoxyethylpenicillin N,N' - dibenzylethylene diamine salt. The said precipitated product was filtered off, washed completely with water and dried in vacuo.

Yield: 3.15 g. (recovery: 65.0%)
M.P.: 90–94° C.
Potency: 820 units/mg. (compared with potassium penicillin G as a standard)

Elemental analysis.—Calculated as based upon

(percent): C, 61.97; H, 6.24; N, 8.67. Found (percent): C, 61.28; H, 6.20; N, 8.34.

EXAMPLE 2

α-Phenoxyethylpenicillin

In Example 1, dimethylformamide as a reaction medium was replaced by methyl isobutyl ketone to produce N,N'-dibenzylethylene diamine α-phenoxyethylpenicillin salt.

Yield: 2.64 g. (recovery: 55.4%)
M.P.: 92–96° C.

Elemental analysis.—Calculated as based upon

(percent): C, 61.97; H, 6.19; N, 8.67. Found (percent): C, 61.33; H, 6.16; N, 8.39.
Potency: 835 units/mg. (compared with potassium penicillin G as a standard)

EXAMPLE 3

α-Phenoxyethylpenicillin

Potassium 6-aminopenicillanic acid (1.27 g., 5 mmole), water (1.0 ml.) and oily N-α-phenoxypropionyl-N-benzoyl-p-toluidine (3.59 g., 10 mmole) obtained in Preparation 4 were added to dimethylformamide (4 ml.) with stirring for 24 hours at room temperature. The reaction mixture was treated as in Example 1 to yield N,N'-dibenzylethylenediamine α-phenoxyethylpenicillin salt.

Yield: 2.36 g. (recovery: 48.8%)
M.P.: 95–98° C.
Potency: 850 units/mg. (compared with potassium penicillin G as a standard)
Elemental analysis.—Calculated as based upon $(C_{17}H_{20}N_2O_5S)_2 \cdot C_{16}H_{20}N_2$ (percent): C, 61.97; H, 6.19; N, 8.67. Found (percent): C, 61.33; H, 6.07; N, 8.48.

EXAMPLE 4

α-Phenoxyethylpenicillin

In Example 1, N-α-phenoxypropionyl-N-benzoyl-p-toluidine was replaced by N-α-phenoxypropionyl-N-benzoyl-β-phenylethylamine to produce N,N'-dibenzylethylenediamine α-phenoxyethylpenicillin salt.

Yield: 2.19 g. (recovery: 45.3%)
M.P.: 95–98° C.
Potency: 820 units/mg. (compared with potassium penicillin G as a standard)
Elemental analysis.—Calculated as based upon $(C_{17}H_{20}N_2O_5S)_2 \cdot C_{16}H_{20}N_2$ (percent): C, 61.97; H, 6.19; N, 8.67. Found (percent): C, 61.03; H, 6.21; N, 8.43.

EXAMPLE 5

α-Phenoxyethylpenicillin

In Example 1, N-α-phenoxypropionyl-N-benzoyl-p-toluidine was replaced by N-α-phenoxypropionyl-N-p-chlorobenzoyl-β-phenylethylamine to produce N,N'-dibenzylethylenediamine α-phenoxyethylpenicillin salt.

Yield: 2.42 g. (recovery: 50.1%)
M.P.: 92–96° C.
Potency: 860 units/mg. (compared with potassium penicillin G as a standard)
Elemental analysis.—Calculated as based upon $(C_{17}H_{20}N_2O_5S)_2 \cdot C_{16}H_{20}N_2$ (percent): C, 61.97; H, 6.19; N, 8.67. Found (percent): C, 61.29; H, 6.25; N, 8.60.

EXAMPLE 6

α-Phenoxyethylpenicillin

In Example 1, N - α - phenoxypropionyl-N-benzoyl-p-toluidine was replaced by N-α-phenoxypropionyl-N-benzoyl-α-naphthylamine to produce N,N'-dibenzylethylenediamine α-phenoxyethylpenicillin salt.

Yield: 2.45 g. (recovery: 51.2%)
M.P.: 92–100° C.
Potency: 810 units/mg. (compared with potassium penicillin G salt as a standard)

Elemental analysis.—Calculated as based upon $(C_{17}H_{20}N_2O_5S)_2 \cdot C_{16}H_{20}N_2$ (percent): C, 61.97; H, 6.19; N, 8.67. Found (percent): C, 62.09; H, 6.51; N, 8.82.

EXAMPLE 7

α-Phenoxyethylpenicillin

In Example 1, N - α - phenoxypropionyl-N-benzoyl-p-toluidine was replaced by N-α-phenoxypropionyl-N-benzoyl-3,4-dichloroaniline to produce N,N'-dibenzylethylenediamine α-phenoxyethylpenicillin salt.

Yield: 2.43 g. (recovery: 51.0%)
M.P.: 91–95° C.
Potency: 770 units/mg. (compared with potassium penicillin G as a standard)
Elemental analysis.—Calculated as based upon $(C_{17}H_{20}N_2O_5S)_2 \cdot C_{16}H_{20}N_2$ (percent): C, 61.97; H, 6.19; N, 8.67. Found (percent): C, 61.84; H, 6.49; N, 8.50.

EXAMPLE 8

α-Phenoxyethylpenicillin

In Example 1, N - α - phenoxypropionyl-N-benzoyl-p-toluidine was replaced by N-α-phenoxypropionyl-N-p-toluoyl-β-phenylethylamine to produce N,N'-dibenzylethylenediamine α-phenoxyethylpenicillin salt.

Yield: 2.18 g. (recovery: 45.0%)
M.P.: 92–95° C.
Potency: 800 units/mg. (compared with potassium penicillin G as a standard)

Elemental analysis.—Calculated as based upon $(C_{17}H_{20}N_2O_5S)_2 \cdot C_{16}H_{20}N_2$ (percent): C, 61.97; H, 6.19; N, 8.67. Found (percent): C, 61.84; H, 6.49; N, 8.50.

EXAMPLE 9

α-Phenoxypropylpenicillin 6-aminopenicillanic acid (1.08 g., 5 mmole), triethylamine (1.4 ml., 10 mmole) and oily N-α-phenoxy-n-butylyl-N-benzoyl-p-toluidine (3.7 g., 10 mmole) were added to dimethylformamide (5 ml.).

The mixture was stirred for 24 hours at room temperature. To this reaction mixture was added methyl isobutyl ketone (25 ml.), and the resultant mixture was extracted with water (10 ml.) plus sufficient 1 N hydrochloric acid to give an aqueous phase of pH 2. The upper organic solvent phase was then washed with water, and extracted with aqueous 0.5 N sodium bicarbonate to give a lower aqueous phase of pH 7. By this procedure, α-phenoxypropylpenicillin alone was transferred to the lower aqueous phase. The bicarbonate phase was adjusted to pH 2 with hydrochloric acid and extracted with methyl isobutyl ketone. After dehydrating the extract with anhydrous sodium sulfate, potassium 2-ethylhexanoate in dry n-butanol was added thereto, precipitating the potassium α-phenoxypropylpenicillin salt therein. The precipitate was filtered, washed with isopropanol and finally dried over phosphorus pentoxide in vacuo to give the potassium α-phenoxypropylpenicillin salt.

Yield: 1.0 g. (recovery: 50.6%)
M.P.: 196–199° C.
Potency: 1380 units/mg. (compared with potassium penicillin G as a standard)

EXAMPLE 10

α-Phenoxyisopropylpenicillin

In Example 9, N-α-phenoxy-n-butylyl-N-benzoyl-p-toluidine was replaced by N-α-phenoxyisobutylyl-N-benzoyl-p-toluidine to produce potassium α-phenoxyisopropylpenicillin.

Yield: 1.05 g. (recovery: 52.3%)
Potency: 1410 units/mg. (compared with potassium penicillin G as a standard)

Elemental analysis.—Calculated as based upon $C_{18}H_{21}N_2O_5S \cdot K$ (percent): C, 51.91; H, 55.08; N, 6.73. Found (percent): C, 52.18; H, 5.24; N, 6.77.

The following examples illustrate the present invention:

EXAMPLE 11

α-Phenoxyethylpenicillin 6-aminopenicillanic acid (1.08 g., 5 mmole), triethylamine (1.4 ml., 10 mmole) and oily N,N-di-α-phenoxypropionyl-p-toluidine (3.71 g., 10 mmole) were added dropwise to dimethylformamide (4 ml.) with stirring at room temperature. This reaction mixture changed gradually from a suspension to a solution after two to four hours. The reaction was almost complete after 24 hours as determined by the hydroxylamine assay on a thin layer chromatogram of silica gel. To the reaction mixture methyl isobutyl ketone (25 ml.) and water (10 ml.) were added and the pH of the aqueous layer was adjusted to about pH 2 by dropwise addition of 1 N hydrochloric acid, with shaking. In the aqueous phase, there was contained unreacted 6-aminopenicillanic acid and excess triethylamine hydrochloride. The upper layer, the organic solvent phase, was washed with water and 0.5 N sodium bicarbonate solution was added with stirring until it attained neutrality. By this procedure α-phenoxyethylpenicillin alone was transferred into the lower aqueous phase. To this aqueous phase a solution of N,N'-dibenzylethylenediamine diacetate in water was added to isolate N,N' - dibenzylethylenediamine α-phenoxyethylpenicillin salt. The said precipitated product was filtered off, washed completely with water and dried in vacuo.

Yield: 4.12 g. (recovery: 85.0%)
M.P.: 97–100° C.

Elemental analysis.—Calculated as based upon $(C_{17}H_{20}N_2O_5S)_2 \cdot C_{16}H_{20}N_2$ (percent): C, 61.97; H, 6.24; N, 8.67. Found (percent): C, 61.28; H, 6.20; N, 8.34.

EXAMPLE 12

α-Phenoxyethylpenicillin

In Example 11, dimethylformamide as a reaction medium was replaced by methyl isobutyl ketone to produce N,N'-dibenzylethylenediamine α - phenoxyethylpenicillin salt.

Yield: 2.86 g. (recovery: 59.0%)
M.P.: 92–93.5° C.

Elemental analysis.—Calculated as based upon $(C_{17}H_{20}N_2O_5S)_2 \cdot C_{16}H_{20}N_2$ (percent): C, 61.97; H, 6.24; N, 8.67. Found (percent): C, 61.86; H, 6.24; N, 8.34.

EXAMPLE 13

α-Phenoxyethylpenicillin

In Example 11, triethylamine was replaced by pyridine to produce N,N'-dibenzylethylenediamine α-phenoxyethylpencillin salt.

Yield: 0.59 g. (recovery: 12.1%)
M.P.: 95–97° C.

EXAMPLE 14

α-Phenoxyethylpenicillin

Potassium 6-aminopenicillanic acid (1.27 g., 5 mmole), water (1.0 ml.) and oily N,N-di-α-phenoxypropionyl-p-toluidine (3.71 g., 10 mmole) were added to dimethylformamide (4 ml.), with stirring for 24 hours at room temperature. The reaction mixture was followed by treatment as in Example 11 to yield N,N'-dibenzylethylenediamine α-phenoxyethylpenicillin salt.

Yield: 2.79 g. (recovery: 57.5%)
M.P.: 93–96° C.

Elemental analysis.—Calculated as based upon $(C_{17}H_{20}N_2O_5S)_2 \cdot C_{16}H_{20}N_2$ (percent): C, 61.97; H, 6.24; N, 8.67. Found (percent): C, 61.94; H, 6.17; N, 8.67.

EXAMPLE 15

α-Phenoxyethylpenicillin

Potassium 6-aminopenicillanic acid (1.27 g., 5 mmole), water (1.0 ml.), triethylamine (0.7 ml., 0.5 mmole) and oily N,N-di-α-phenoxypropionyl-p-toluidine (3.71 g., 10 mmole) were added to dimethylformamide (4 ml.) with stirring for 24 hours at room temperature. The reaction mixture was followed by treatment as in Example 11 to yield N,N'-dibenzylethylenediamine α - phenoxyethylpenicillin salt.

Yield: 2.09 g. (recovery: 43.2%)
M.P.: 98–100° C.

Elemental analysis.—Calculated as based upon $(C_{17}H_{20}N_2O_5S)_2 \cdot C_{16}H_{20}N_2$ (percent): C, 61.97; H, 6.34; N, 8.67. Found (percent): C, 61.30; H, 6.33; N, 8.49.

EXAMPLE 16

α-Phenoxyethylpenicillin

In Example 11, N,N-di-α-phenoxypropionyl-p-toluidine was replaced by oily N,N-di-α-phenoxypropionyl-n-butylamine to produce N,N'-dibenzylethylenediamine α-phenoxyethylpenicillin salt.

Yield: 3.37 g. (recovery: 69.6%)
M.P.: 89–91° C.

Elemental analysis.—Calculated as based upon $(C_{17}H_{20}N_2O_5S)_2 \cdot C_{16}H_{20}N_2$ (percent): C, 61.97; H, 6.24; N, 8.67. Found (percent): C, 61.10; H, 6.18; N, 8.38.

EXAMPLE 17

α-Phenoxyethylpenicillin

In Example 11, N,N-di-α-phenoxypropionyl-p-toluidine was replaced by oily N,N-di-α-phenoxypropionyl-n-hexylamine to produce N,N'-dibenzylethylenediamine α-phenoxyethylpenicillin salt.

Yield: 3.13 g. (recovery: 64.5%)
M.P.: 89–91° C.

Elemental analysis.—Calculated as based upon $(C_{17}H_{20}N_2O_5S)_2 \cdot C_{16}H_{20}N_2$ (percent): C, 61.97; H, 6.24; N, 8.67. Found (percent): C, 62.02; H, 6.23; N, 8.14.

EXAMPLE 18

α-Phenoxyethylpenicillin

In Example 11, N,N-di-α-phenoxypropionyl-p-toluidine was replaced by oily N,N-di-α-phenoxypropionyl-β-phenylethylamine to produce N,N'-dibenzylethylenediamine α-phenoxyethylpenicillin.

Yield: 3.32 g. (recovery: 68.5%)
M.P.: 89.5–92.0° C.

Elemental analysis.—Calculated as based upon $(C_{17}H_{20}C_2O_5S)_2 \cdot C_{16}H_{20}N_2$ (percent): C, 61.97; H, 6.24; N, 8.67. Found (percent): C, 61.00; H, 6.17; N, 8.26.

EXAMPLE 19

α-Phenoxyethylpenicillin

In Example 11, N,N-di-α-phenoxypropionyl-p-toluidine was replaced by crystalline N,N-di-α-phenoxypropionyl-p-methoxybenzylamine to produce N,N'-dibenzylethylenediamine α-phenoxyethylpenicillin salt.

Yield: 1.96 g. (recovery: 40.5%)
M.P.: 88–93° C.

Elemental analysis.—Found (percent): C, 61.49; H, 6.67; N, 8.95.

EXAMPLE 20

α-Phenoxyethylpenicillin

In Example 11, N,N-di-α-phenoxypropionyl-p-toluidine was replaced by oily N,N-di-α-phenoxypropionyl-aniline to produce N,N'-dibenzylethylenediamine α-phenoxyethylpenicillin salt.

Yield: 4.09 g. (recovery: 84.5%)
M.P.: 93–98° C.

EXAMPLE 21

α-Phenoxyethylpenicillin

In Example 11, N,N-di-α-phenoxypropionyl-p-toluidine was replaced by N,N-di-α-phenoxypropionyl-p-ethoxyaniline to produce N,N'-dibenzylethylenediamine α-phenoxyethylpenicillin salt.

Yield: 4.19 g. (recovery: 86.5%)
M.P.: 94–96° C.

Elemental analysis.—Found (percent): C, 61.74; H, 6.18; N, 8.49.

EXAMPLE 22

α-Phenoxyethylpenicillin

In Example 11, N,N-di-α-phenoxypropionyl-p-toluidine was replaced by N,N-di-α-phenoxypropionyl-m-chloroaniline. To the resulting dark green reaction mixture methyl isobutyl ketone (25 ml.) and water (10 ml.) were added and the pH of the aqueous layer was adjusted to about pH 2 by dropwise addition of 1 N hydrochloric acid, with shaking. The upper phase the organic solvent layer, was washed with water, and 0.5 N sodium bicarbonate solution was added with stirring until it attained neutrality. After the said aqueous solution was decolored by active carbon, a solution of N,N'-dibenzylethylenediamine diacetate in water was added to the aqueous phase to isolate N,N'-dibenzylethylenediamine α-phenoxyethylpenicillin salt.

Yield: 2.98 g. (recovery: 61.6%)
M.P.: 97–100° C.

Elemental analysis.—Found (percent): C, 61.55; H, 6.17; N, 8.38.

EXAMPLE 23

α-Phenoxyethylpenicillin

In Example 11, N,N-di-α-phenoxypropionyl-p-toluidine was replaced by oily N N-di-α-phenoxypropionyl-α-naphthylamine to produce N,N'-dibenzylethylenediamine α-phenoxy ethylpenicillin salt.

Yield: 2.76 g. (recovery: 57.0%)
M.P.: 91–95° C.

Elemental analysis.—Found (percent): C, 61.40; H, 6.34; N, 8.35.

EXAMPLE 24

α-Phenoxyethylpenicillin

To the reaction mixture obtained by the same procedure as described in Example 11, methyl isobutyl ketone and water were added and the pH of the aqueous layer was adjusted to about pH 2 by dropwise addition of 1 N hydrochloric acid, with shaking. The upper layer, the organic solvent phase, was washed with water, and 0.5 N sodium bicarbonate solution was added with stirring until it attained neutrality. By this procedure α-phenoxyethylpenicillin alone was transferred into the lower aqueous phase. The said aqueous phase was adjusted to pH 2 with addition of hydrochloric acid and extracted with methyl isobutyl ketone. After the solvent phase was dehydrated with anhydrous sodium sulfate and separated dry n-butanol solution of potassium 2-ethylhexanoate was added to precipitate potassium α-phenoxyethylpenicillin. The thus precipitated material was filtered off, washed with isopropanol and dried in vacuo.

Yield: 1.54 g. (recovery: 76.5%)
M.P.: 218–220° C.

The product was easily soluble in water and found to contain β-lactam group upon infrared analysis.

EXAMPLE 25

α-Phenoxypropylpenicillin 6-aminopenicillanic acid (1.08 g., 5 mmole), triethylamine (1.4 ml., 10 mmole) and oily N,N-di-α-phenoxybutyryl-p-toluidine (3.99 g. 10 mmole) were added to dimethylformamide (5 ml.) and stirred for 24 hours at room temperature. To the reaction mixture methyl isobutyl ketone (25 ml.) and water (10 ml.) were added and the pH of the aqueous layer was adjusted to about pH 2 by dropwise addition of 1 N hydrochloric acid, with shaking. The upper layer, the organic solvent phase, was washed with water, and 0.5 N sodium bicarbonate solution was added with stirring until it attained neutrality. By this procedure α-phenoxypropyl-penicillin alone was transferred into the lower aqueous phase. The aqueous phase was adjusted to pH 2 with hydrochloric acid and extracted with methyl isobutyl ketone. The thus extracted solvent phase was purified by the same procedure as described in Example 24 to yield potassium α-phenoxypropylpenicillin.

Yield: 1.42 g. (recovery: 68.0%)
M.P.: 195–197° C.

The product was found to contain β-lactum group upon infrared analysis.

Elemental analysis.—Calculated as based upon $$C_{18}H_{21}N_2O_5SK$$

(percent): C, 51.91; H, 5.08; N, 6.73. Found (percent): C, 51.20; H, 5.32; N, 6.44.

EXAMPLE 26

α-Phenoxypropylpenicillin 6-aminopenicillanic acid (1.08 g., 5 mmole), triethylamine (1.40 ml., 10 mmole) and oily N,N-di-α-phenoxy-n-butyryl-n-hexylamine (3.96 g., 10 mmole) were added to dimethylformamide (5 ml.) and stirred for 24 hours at room temperature. The reaction mixture was treated by the same procedure as in Example 25 to obtain potassium α-phenoxypropylpenicillin.

Yield: 1.08 g. (recovery: 51.7%)
M.P.: 197–199° C.

EXAMPLE 27

α-Phenoxyisopropylpenicillin

In Example 25, N,N-diα-phenoxy-n-butyryl-p-toluidine was replaced by N,N-di-α-phenoxyisobutyryl-p-toluidine to produce potassium α-phenoxyisopropylpenicillin.

Yield: 1.24 g. (recovery: 59.5%)

Elemental analysis.—Calculated as based upon $$C_{18}H_{21}N_2O_5SK$$

(percent): C, 51.91; H, 5.08; N, 6.73. Found (percent): C, 51.32; H, 5.33; N, 6.50.

EXAMPLE 28

α-Phenoxymethylpenicillin 6-aminopenicillanic acid (1.08 g., 5 mmole), triethylamine (1.40 ml., 10 mmole) and oily N,N-di-α-phenoxyacetyl-p-ethoxyaniline (3.97 g., 10 mmole) were added to dimethylformamide (4 ml.) and stirred for 24 hours at room temperature. The reaction mixture was treated by the same procedure as described in Example 24 to yield potassium α-phenoxymethylpenicillin.

Yield: 1.71 g. (recovery: 88.0%)
M.P.: 232–234° C.

Elemental analysis.—Calculated as based upon $$C_{16}H_{17}N_2O_5SK$$

(percent): C, 49.48; H, 4.41; N, 7.21. Found (percent): C, 49.93; H, 4.28; N, 7.10.

Having described our invention, we claim:

1. A process for production of a member selected from the group consisting of α-phenoxyalkyl penicillin having the formula:

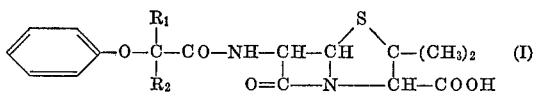 (I)

and metal salts and tertiary amine salts thereof, wherein $R_1$ and $R_2$ are the same or different and each is a member selected from the group consisting of hydrogen and lower alkyl, which comprises reacting by admixing in liquid phase an N,N-diacyl compound of the formula:

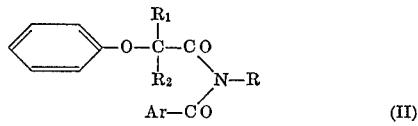 (II)

wherein R is a member selected from the group consisting of alkyl having 1–14 carbon atoms, cyclohexyl, phenyl, naphthyl, benzyl, phenylethyl, and at least one member of the class consisting of phenyl, benzyl and phenylethyl substituted with at least one member of the group consisting of methyl, ethyl, methoxy, ethoxy, chloro and bromo, and Ar is a member selected from the group consisting of phenyl, phenoxy-lower-alkyl and phenyl substituted with at least one member selected from the group consisting of methyl, ethyl, methoxy, ethoxy, chloro, bromo and nitro, and $R_1$ and $R_2$ have the same meaning as set forth hereinabove, with a member selected from the group consisting of 6-aminopenicillanic acid of the formula:

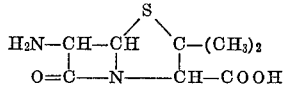

and metal salts and tertiary amine salts thereof.

2. Process according to claim 1, wherein the reaction is carried out in an organic solvent or aqueous organic solvent in which the reaction components are soluble.

3. Process according to claim 1, wherein the 6-aminopenicillanic acid is used in the form of the free acid or in the form of a metal salt or of a salt with a tertiary amine.

4. Process according to claim 3, wherein the 6-aminopenicillanic acid is used in the form of a mixture of 1 mole thereof with 1–2 moles of a tertiary amine.

5. Process according to claim 1, wherein 1.5–2.0 moles of the N,N-diacyl compound are used per mole of 6-aminopenicillanic acid or salt thereof.

6. Process according to claim 1, carried out at ambient temperature.

References Cited

UNITED STATES PATENTS 3,245,983  4/1966  Doyle et al. _____ 260—239.1

NICHOLAS S. RIZZO, Primary Examiner